(12) United States Patent
Ito (10) Patent No.: US 11,451,759 B2
(45) Date of Patent: Sep. 20, 2022

(54) GENERATION APPARATUS, GENERATION METHOD, AND STORAGE MEDIUM

(71) Applicant: CANON KABUSHIKI KAISHA, Tokyo (JP)

(72) Inventor: Hiroyasu Ito, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/011,579

(22) Filed: Sep. 3, 2020

(65) Prior Publication Data
US 2020/0404240 A1      Dec. 24, 2020

Related U.S. Application Data

(63) Continuation of application No. PCT/JP2018/048468, filed on Dec. 28, 2018.

(30) Foreign Application Priority Data

Mar. 9, 2018 (JP) .............................. JP2018-043459

(51) Int. Cl.
*H04N 13/189*       (2018.01)
*H04N 13/282*       (2018.01)
(Continued)

(52) U.S. Cl.
CPC ......... *H04N 13/189* (2018.05); *G06F 16/116* (2019.01); *G06F 16/51* (2019.01); *H04N 13/178* (2018.05); *H04N 13/282* (2018.05)

(58) Field of Classification Search
CPC .. H04N 13/282; H04N 13/189; H04N 13/178; H04N 13/111; H04N 13/279; G06F 16/116
See application file for complete search history.

(56) References Cited

U.S. PATENT DOCUMENTS

| 7,679,616 B2 * | 3/2010 | Nomura ............... H04N 13/178 345/419 |
| 2007/0122027 A1 * | 5/2007 | Kunita ................... G06T 7/593 382/154 |

(Continued)

FOREIGN PATENT DOCUMENTS

| JP | 2003242043 A | 8/2003 |
| JP | 2013172456 A | 9/2013 |

(Continued)

OTHER PUBLICATIONS

Hiramatsu, Tatsuo et al. Data Handling Formats for Health Monitor Devices that Use JPEG+Exif Interchange Format as a Container. Medical Informatics, Proceedings of the 32nd Joint Conference on Medical Informatics (13th Conference of Japan Association for Medical Informatics).

(Continued)

*Primary Examiner* — Rowina J Cattungal
(74) *Attorney, Agent, or Firm* — Carter, DeLuca & Farrell LLP (57) ABSTRACT

A generation apparatus according to the present invention is a generation apparatus for generating a media file storing virtual viewpoint image data generated based on pieces of image data of an object captured from a plurality of directions with a plurality of cameras, and obtains a virtual viewpoint parameter to be used to generate virtual viewpoint image data. Further, the generation apparatus generates a media file storing the obtained virtual viewpoint parameter and virtual viewpoint image data generated based on the virtual viewpoint parameter. In this way, the generation apparatus can improve usability related to a virtual viewpoint image.

13 Claims, 8 Drawing Sheets

(51) Int. Cl.
*H04N 13/178* (2018.01)
*G06F 16/51* (2019.01)
*G06F 16/11* (2019.01)

(56) References Cited

U.S. PATENT DOCUMENTS

| | | | | |
|---|---|---|---|---|
| 2009/0106202 A1* | 4/2009 | Mizrahi | ............... | G06F 16/48 |
| | | | | 707/E17.02 |
| 2010/0020068 A1* | 1/2010 | House | ............... | G06T 15/08 |
| | | | | 345/419 |
| 2011/0292045 A1* | 12/2011 | Nakamura | ............ | G06T 15/00 |
| | | | | 345/419 |
| 2013/0315558 A1* | 11/2013 | Nakamura | ............ | H04N 13/128 |
| | | | | 386/230 |

FOREIGN PATENT DOCUMENTS

| | | | |
|---|---|---|---|
| JP | 2014215828 A | 11/2014 | |
| WO | 2011136191 A1 | 11/2011 | |
| WO | 2012105121 A1 | 8/2012 | |

OTHER PUBLICATIONS

Notice of Reasons for Refusal issued by the Japan Patent Office on Apr. 12, 2022 in corresponding JP Patent Application No. 2018-043459, with English translation.

* cited by examiner

| VVP ID TAG | FIELD NAME | TYPE | COUNT |
|---|---|---|---|
| VERSION | VVP VERSION ID | BYTE | 4 |
| ORIENTATION PARAMETER | ROTATION QUATERNION | SLONG | 4 |
| POSITION PARAMETER | TRANSLATION VECTOR | SLONG | 3 |
| VIEWING ANGLE PARAMETER | HORIZONTAL ANGLE | SLONG | 1 |

FIG.4A

ORIENTATION PARAMETER: 500000, -500000, 500000, -500000

POSITION PARAMETER: 123399971, 0, 31

VIEWING ANGLE PARAMETER: 50000000

```
<div class="VVP_frame_0">
    <div class="rotation_quaternion">
        <span class="t">0.500000</span>;
        <span class="x">-0.500000</span>;
        <span class="y">0.500000</span>;
        <span class="z">-0.500000</span>
    </div>
    <div class="translation_vector">
        <span class="x">123.399971</span>;
        <span class="y">0.000000</span>;
        <span class="z">0.000031</span>
    </div>
    <div class="horizontal_angle">
        <span class="x">50.000000</span>
    </div>
</div>
<div class="VVP_frame_1">
    <div class="rotation_quaternion">
        <span class="t">0.500000</span>;
        <span class="x">-0.500000</span>;
        <span class="y">0.500000</span>;
        <span class="z">-0.500000</span>
    </div>
    <div class="translation_vector">
        <span class="x">123.399971</span>;
        <span class="y">0.010000</span>;
        <span class="z">0.000031</span>
    </div>
    <div class="horizontal_angle">
        <span class="x">50.000000</span>
    </div>
</div>
    . . . . . . . . . .
<div class="VVP_frame_n">
    . . . . . . . . . .
</div>
```

VIRTUAL VIEWPOINT PARAMETER OF FRAME 0

VIRTUAL VIEWPOINT PARAMETER OF FRAME 1

VIRTUAL VIEWPOINT PARAMETER OF FRAME n

GENERATION APPARATUS, GENERATION METHOD, AND STORAGE MEDIUM

CROSS-REFERENCE TO RELATED APPLICATIONS

This application is a Continuation of International Patent Application No. PCT/JP2018/048468, filed Dec. 28, 2018, which claims the benefit of Japanese Patent Application No. 2018-043459, filed Mar. 9, 2018, both of which are hereby incorporated by reference herein in their entirety.

BACKGROUND OF THE INVENTION

Field of the Invention

The present invention relates to a virtual viewpoint image.

Description of the Related Art

In recent years, a technique has been drawing attention which involves installing a plurality of cameras at different positions, capturing images from a plurality of viewpoints with them in synchronization with each other, and using a multi-viewpoint image obtained by this image capturing to generate an image (virtual viewpoint image) from any virtual camera (virtual viewpoint). Such a technique enables a user to view highlight scenes in, for example, a soccer game or a basketball game from various angles, and can therefore provide the user with a higher sense of presence than normal image contents.

Japanese Patent Laid-Open No. 2014-215828 discloses that a plurality of cameras are disposed so as to surround the same region and a virtual viewpoint image is generated using images of this same region captured by the cameras.

However, there are various problems in the handling of virtual viewpoint images. For example, in a case where a plurality of virtual viewpoint images have been generated, it may not be easy to search for a particular virtual viewpoint image from among them. This problem is conspicuous especially in a case where the plurality of virtual viewpoint images have been generated at the same time in the same scene. Another problem is, for example, that in a case where a plurality of virtual viewpoint image files are present in a single folder (directory), it may be difficult to sort them according to the user's intention. Still another problem is, for example, that it may not be possible to fulfill a need to display viewpoint information on a virtual viewpoint image while this virtual viewpoint image is being displayed. Yet another problem is that a user viewing a virtual viewpoint image may wish to edit the virtual viewpoint but it may be difficult to do so. As described above, there have been various problems in the handling of virtual viewpoint images.

The present invention has been made to improve at least one of various inconveniences related to the handling of virtual viewpoint images, and an object thereof is to improve usability related to virtual viewpoint images.

SUMMARY OF THE INVENTION

A generation apparatus according to the present invention is a generation apparatus comprising: an obtaining unit configured to obtain a virtual viewpoint parameter which indicates at least one of a position of a virtual viewpoint and a direction from a virtual viewpoint, and is used to for generating virtual viewpoint image data generated based on image data obtained based on image capturing by a plurality of imaging devices; and a generation unit configured to generate a media file storing the virtual viewpoint parameter obtained by the obtaining unit and virtual viewpoint image data generated based on the virtual viewpoint parameter obtained by the obtaining unit.

Further features of the present invention will become apparent from the following description of an embodiment to be given with reference to the attached drawings.

DESCRIPTION OF THE EMBODIMENTS

An embodiment of the present invention will be described below in detail. Note that the components described in the following embodiment merely represent exemplary modes of the present invention and do not limit the scope of the present invention only to those.

First Embodiment

Figure 1:
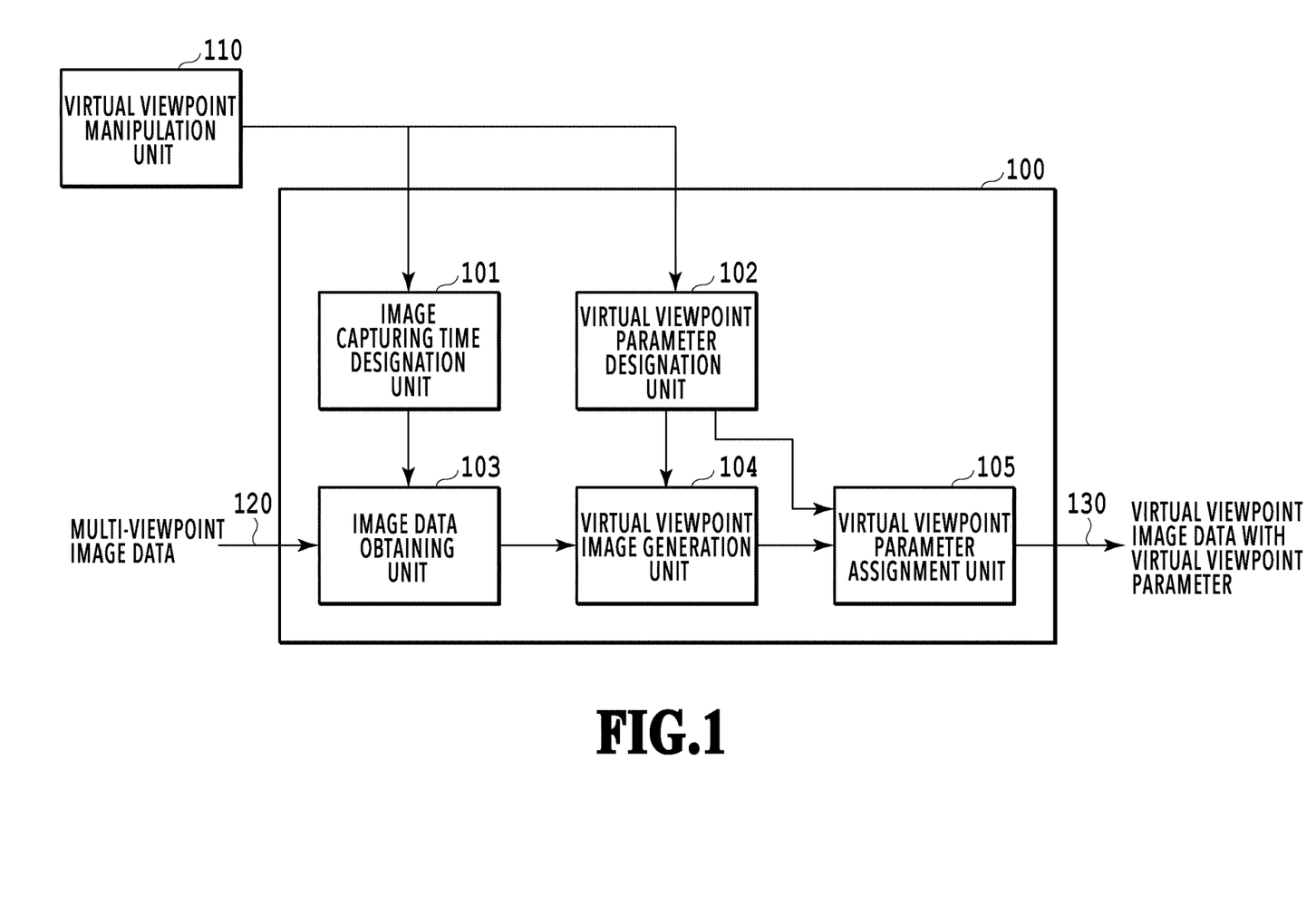
FIG. 1 is a block diagram showing an example of the configuration of an image processing system in a first embodiment.

First, a configuration of an image processing system in a first embodiment will be described. FIG. 1 is a block diagram showing an example of the configuration of the image processing system in the first embodiment. The image processing system in the present embodiment includes an image processing apparatus (also referred to as a generation apparatus) 100 which generates virtual viewpoint image data, and a virtual viewpoint manipulation unit 110 with which a user manipulates a virtual viewpoint. The image processing apparatus 100 receives multi-viewpoint image data 120. Also, the image processing apparatus 100 outputs virtual viewpoint image data 130 with a virtual viewpoint parameter (hereinafter referred to as the second virtual viewpoint image data 130). The multi-viewpoint image data 120 is image data obtained by installing a plurality of cameras at different positions and capturing images from a plurality of viewpoints with them in synchronization with each other. In addition to data representing the images captured from the respective viewpoints, the multi-viewpoint image data 120 may contain the image capturing times, information on the cameras, and so on.

As shown in FIG. 1, the image processing apparatus 100 has an image capturing time designation unit 101, a virtual viewpoint parameter designation unit 102, an image data obtaining unit 103, a virtual viewpoint image generation unit 104, and a virtual viewpoint parameter assignment unit 105. The image processing apparatus 100 is a computer such as a PC (Personal Computer), a WS (Work Station), or any of various servers, for example. Note that the image processing apparatus 100 does not have to be a general-purpose computer but may be a dedicated computer equipped with a CPU, a ROM, a RAM, a non-volatile memory, and so on. Alternatively, the above components may be caused to function in separate computers, and they may be connected via a network or the like. Also, each of the above components may be configured with a piece of dedicated hardware. In this case, each piece of hardware executes a process by starting a program stored in a memory or the like.

The image capturing time designation unit 101 designates an image capturing time for the image data obtaining unit 103. The image capturing time may be an absolute time or a relative time based on the image capturing starting time as 0. Note that the representation format of the relative time may be a general standard timecode or one similar to it.

The virtual viewpoint parameter designation unit 102 designates a virtual viewpoint parameter for the virtual viewpoint image generation unit 104. In the present embodiment, the virtual viewpoint parameter includes one or more parameters among direction information indicating a direction from a virtual viewpoint, position information indicating a position of a virtual viewpoint, and angle information indicating a viewing angle of a virtual viewpoint.

From the multi-viewpoint image data 120, the image data obtaining unit 103 obtains the image data at the image capturing time designated by the image capturing time designation unit 101. Here, the multi-viewpoint image data 120 may be image data generated directly by the plurality of cameras (not shown) or image data stored in a computer (not shown).

Using the image data obtained by the image data obtaining unit 103, the virtual viewpoint image generation unit 104 generates virtual viewpoint image data according to the virtual viewpoint parameter designated by the virtual viewpoint parameter designation unit 102. The method of generating the virtual viewpoint image data is not particularly limited. For example, a method may be used which involves constructing a three-dimensional model of a subject (object) and mapping image data.

The virtual viewpoint parameter assignment unit 105 assigns the virtual viewpoint parameter designated by the virtual viewpoint parameter designation unit 102 to the virtual viewpoint image data generated by the virtual viewpoint image generation unit 104 to thereby generate the second virtual viewpoint image data 130, and outputs it. The second virtual viewpoint image data 130 may be a one-frame still image, image data with one or more frames of still images, or image data of a moving image.

In the present embodiment, the image capturing time information and the virtual viewpoint parameter to be used to generate the virtual viewpoint image data are obtained from the virtual viewpoint manipulation unit 110 outside the image processing apparatus 100. However, either or both of the image capturing time information and the virtual viewpoint parameter to be used to generate the virtual viewpoint image data may be held in the image processing apparatus 100 in advance, or these pieces of information may be generated automatically. Note that a possible example of the virtual viewpoint manipulation unit 110 may be an apparatus that displays, on a user interface window, the direction of the view of the user in a target virtual space in which the user is assumed to be present, as with various three-dimensional simulators and three-dimensional video games. With such a configuration, the user can input a desired virtual viewpoint into the virtual viewpoint manipulation unit 110 by operating a joy stick or the like so as to freely move in the virtual space or face a direction in which the user wishes to look in the virtual space. Meanwhile, the image processing apparatus 100 and the virtual viewpoint manipulation unit 110 are connected via an external interface. Note that Ethernet (registered trademark) is used in the present embodiment as the interface for the connection between the image processing apparatus 100 and the virtual viewpoint manipulation unit 110, but USB or the like, or another interface may be used. Also, the image processing apparatus 100 and the virtual viewpoint manipulation unit 110 may be housed in the same housing. In this case, the image processing apparatus 100 and the virtual viewpoint manipulation unit 110 are connected by an internal bus inside the computer.

Figure 2:
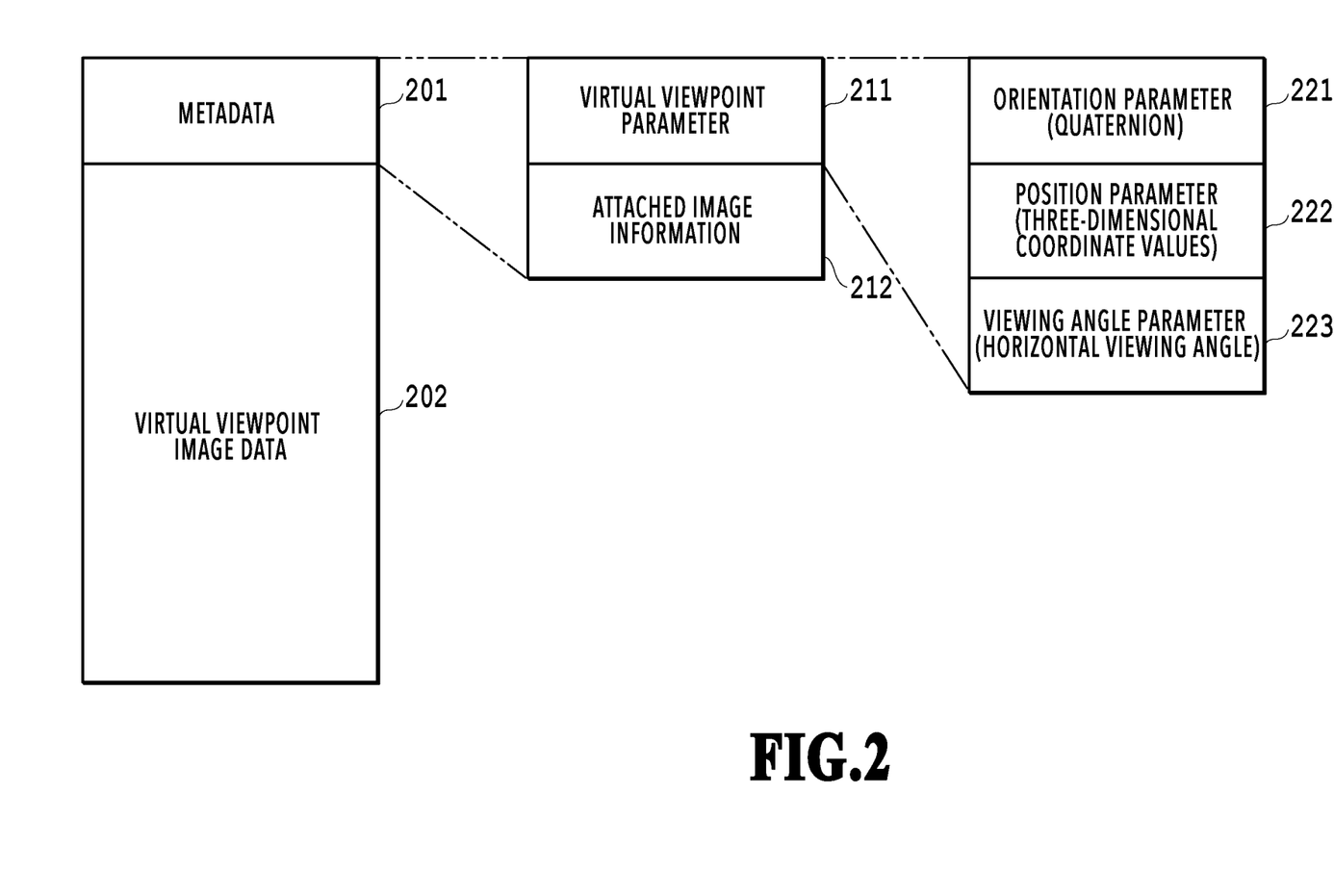
FIG. 2 is an explanatory diagram showing a format of virtual viewpoint image data with a virtual viewpoint parameter.

Next, a data structure of the second virtual viewpoint image data 130 will be schematically described. FIG. 2 is an explanatory diagram showing a format of the second virtual viewpoint image data. As shown in FIG. 2, metadata 201 is assigned to virtual viewpoint image data 202, and the metadata 201 contains a virtual viewpoint parameter 211 and attached image information 212. The attached image information 212 is metadata generally assigned to an image such as the image capturing time information, the image resolution, and the color space, for example. Note that this image capturing time information is the image capturing time of the multi-viewpoint image data 120 to be used as the source of the target virtual viewpoint image data, and may be an absolute time or a relative time based on the image capturing starting time as 0. Note that the representation format of the relative time may be a general standard timecode or one similar to it, as mentioned above. Also, in the present embodiment, the attached image information 212 has been assigned to the multi-viewpoint image data 120 inputted into the image data obtaining unit 103.

The virtual viewpoint parameter 211 contains one or more parameters among an orientation parameter 221, a position parameter 222, and a viewing angle parameter 223. Here, the virtual viewpoint parameter 211 will be described. The orientation parameter 221 of the virtual viewpoint parameter 211 is a parameter indicating the orientation of the virtual camera. In the present embodiment, the orientation of the virtual camera is represented with a quaternion. The quaternion is represented by the following equation (1).

[Math. 1]

$$Q=(0;x,y,z) \qquad (1)$$

In the equation (1), the left side of the semicolon represents a real part, and x, y, and z represent an imaginary part. By using the quaternion representation, any rotation about any direction can be easily represented. Specifically, the procedure is as follows.

First, a point P desired to be rotated is represented with the following equation (2).

[Math. 2]

$$P=(0;xp,yp,zp)=(0;Vp) \qquad (2)$$

Then, let a vector representing the direction of the rotation axis be represented as v=(xv, yv, zv) and let the desired angle of rotation be represented as θ. From this vector v, two quaternions Q and R are derived using the following equations (3) and (4). Note that the vector v is normalized.

[Math. 3]

$$Q=(\cos(\theta/2); xv^*\sin(\theta/2), yv^*\sin(\theta/2), zv^*\sin(\theta/2)) \quad (3)$$

[Math. 4]

$$R=(\cos(\theta/2); -xv^*\sin(\theta/2), -yv^*\sin(\theta/2), -zv^*\sin(\theta/2)) \quad (4)$$

Lastly, an arithmetic operation as described in the following equation (5) is executed.

[Math. 5]

$$R^*P^*Q=(0; x, y, z) \quad (5)$$

As a result, a point rotated from the point P by θ around an axis oriented in the vector v is obtained as coordinates (x, y, z). Note that the representation method for the orientation parameter 221 is not limited to this, and the orientation parameter 221 may be represented by means of a rotation matrix, for example.

The position parameter 222 is a parameter indicating the position of the virtual camera. It is three-dimensional coordinates (x, y, z) in a world coordinate system with an origin at (0, 0, 0). Thus, in the present embodiment, the position parameter 222 is expressed as a three-dimensional vector.

The viewing angle parameter 223 is the horizontal viewing angle of the virtual viewpoint. Note that the representation method for the horizontal viewing angle is not limited. For example, it may be represented as an angle in the range of 0 degree to 180 degrees or represented as the focal length of a 35-mm film camera with a 50 mm as a reference focal length. Also, the value of the horizontal viewing angle may be represented using an integer or a floating point number. Also, the aspect ratio of the window may be the viewing angle parameter. In this case, the aspect ratio may be represented as a value, or a predefined aspect ratio such as 4:3 or 16:9 may be assigned a code and represented with the code.

Figure 3A:
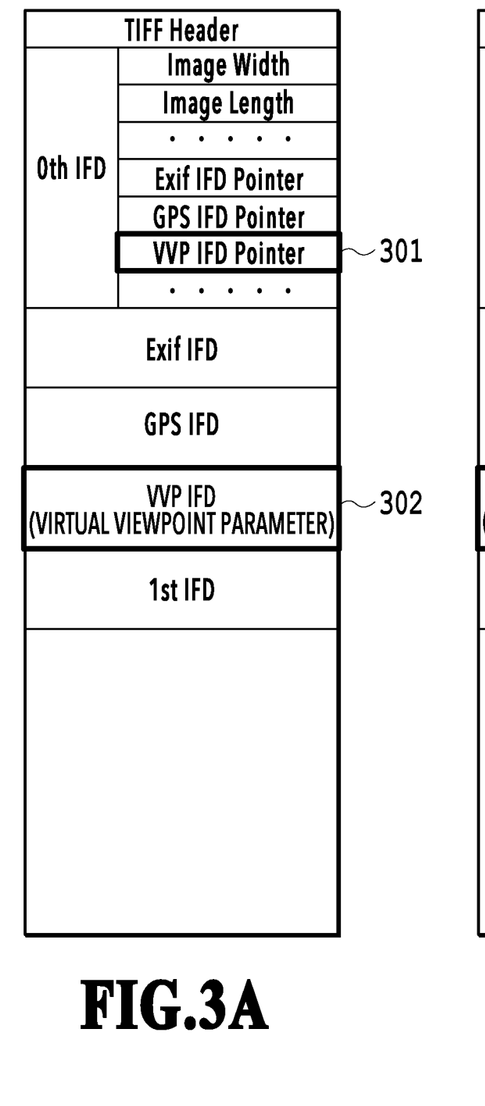
FIGS. 3A and 3B are diagrams for explaining methods of assigning a virtual viewpoint parameter to virtual viewpoint image data in a still image file format.
Figure 3B:
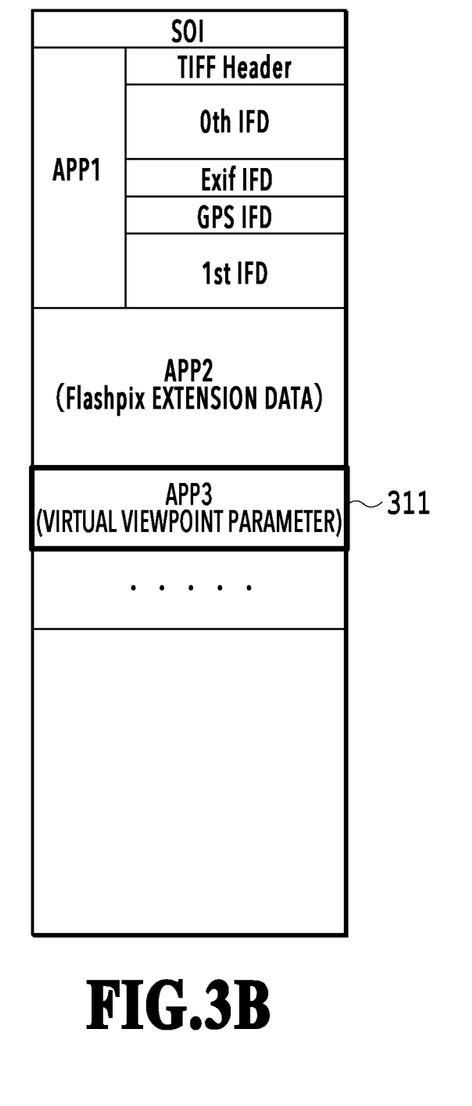

FIGS. 3A and 3B show examples of a case where a virtual viewpoint parameter is assigned in the file format (hereinafter Exif) of "Camera & Imaging Products Association standard DC-008-2012: file format standard Exif 2.3 for digital still cameras" (hereinafter the Exif standard).

Figure 4A:
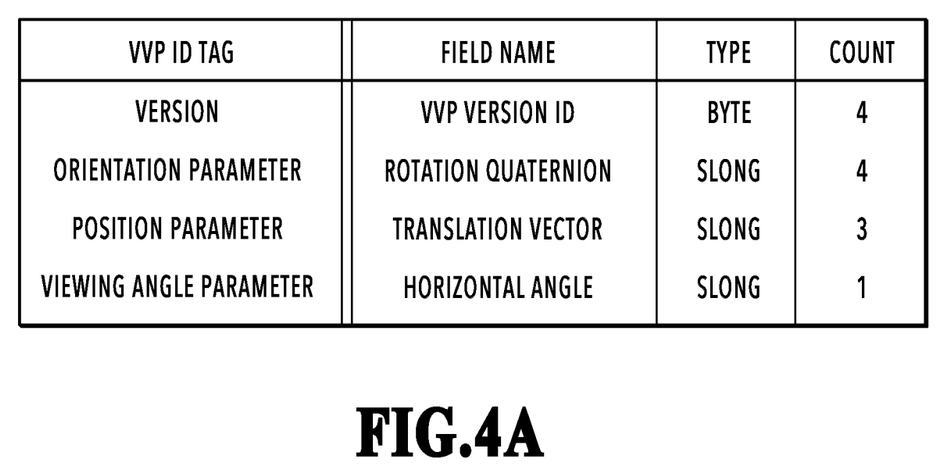
FIGS. 4A and 4B are diagrams showing an example of the configuration of tag information of a VVP IFD.
Figure 4B:
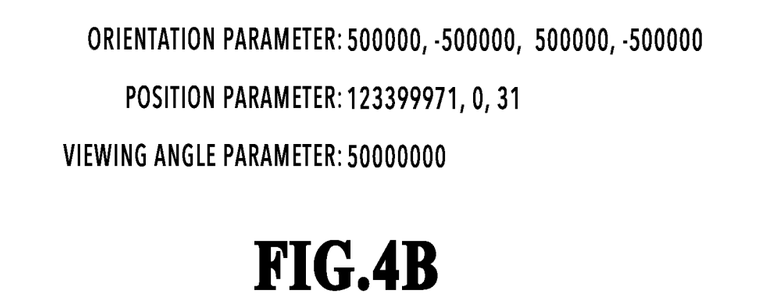

FIG. 3A shows an example where an IFD area (VVP IFD 302) is newly defined in the metadata area defined in the Exif standard, and the virtual viewpoint parameter is stored in the VVP IFD 302. Note that the VVP IFD stands for Virtual Viewpoint Parameter Image File Directory. A VVP IFD Pointer 301 in the 0th IFD is a pointer that indicates the VVP IFD 302. FIGS. 4A and 4B are diagrams showing examples of the configuration of tag information of the VVP IFD. As shown in FIG. 4A, the VVP IFD contains a "version" tag, an "orientation parameter" tag, a "position parameter" tag, and a "viewing angle parameter" tag. In the diagram, "Filed Name" represents the name of each tag, "Type" represents the data type of each tag, and the "Count" represents the number of pieces of data in each tag. FIG. 4B shows an example of the values set in the orientation parameter, the position parameter, and the viewing angle parameter. The value of the orientation parameter at the left end is the value of the real part of the quaternion, and the three values on the right side is the values of the imaginary part of the quaternion. The values in the position parameter are the three-dimensional coordinate values. The value in the viewing angle parameter is the horizontal viewing angle.

FIG. 3B shows an example where APP3 (an area 311 in the diagram) as an undefined APPn marker segment that is not defined in the Exif standard but can be utilized by a vendor or industry organization as desired is utilized, and the virtual viewpoint parameter is stored in this area.

As described above, the second virtual viewpoint image data can be generated by additionally defining an area to store the virtual viewpoint parameter 211 in Exif, which is an existing still image file format (hereinafter simply referred to as the still image format). Note that in the above example, Exif has been described as an example of the still image format, but the format is not limited to this. The format may be another standard file format or an original format. Also, the values and representations of the parameters are not limited to the above.

Figure 5:
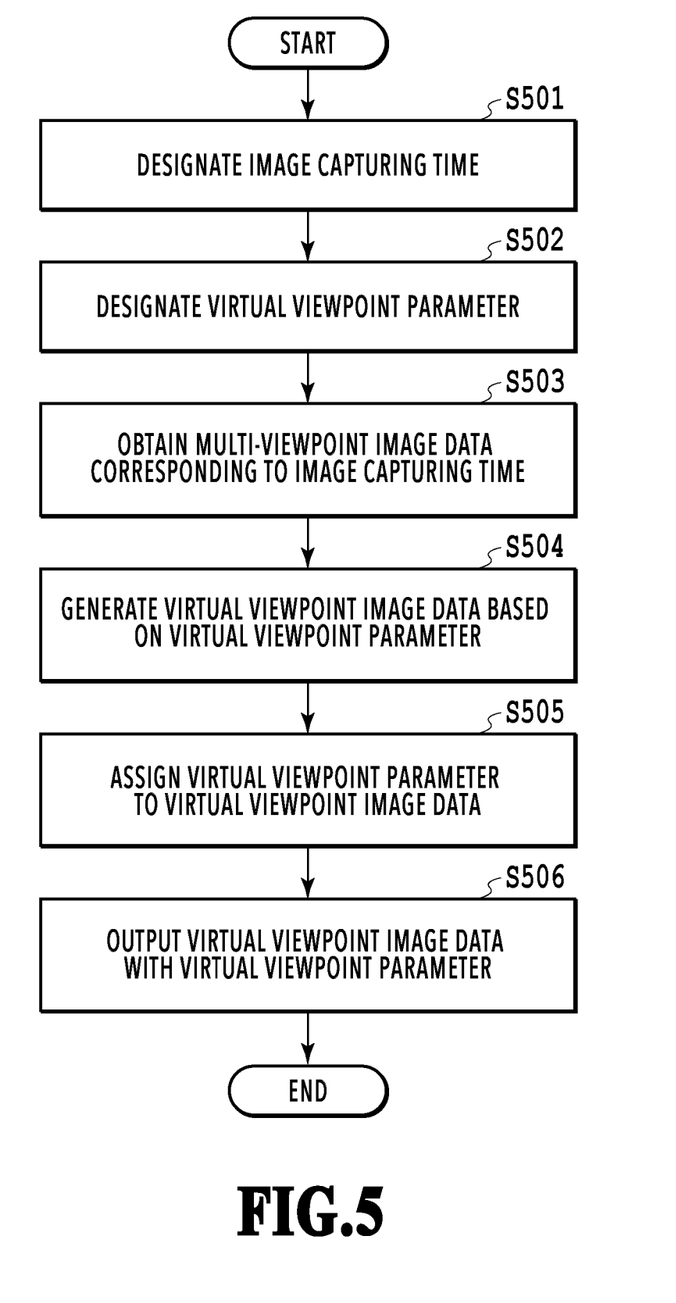
FIG. 5 is a flowchart showing a flow of processing by an image processing apparatus in the first embodiment.

Here, the processing by the image processing apparatus 100 will be described using FIG. 5. FIG. 5 is a flowchart showing a flow of the processing by the image processing apparatus 100 in the first embodiment. In an example, the CPU (not shown) of the image processing apparatus 100 performs the series of processes shown in the flowchart in FIG. 5 by deploying program code stored in the ROM (not shown) into the RAM (not shown) and executing it. In another example, some or all of the steps in FIG. 5 may be implemented with hardware such as an ASIC or an electronic circuit. The flow shown in FIG. 5 is executed, for example, in response to a start operation from the user.

In step S501, the image capturing time designation unit 101 designates an image capturing time for the image data obtaining unit 103. More specifically, the image capturing time designation unit 101 passes image capturing time information inputted from the virtual viewpoint manipulation unit 110 (hereinafter simply referred to as the time information) to the image data obtaining unit 103. In S502, the virtual viewpoint parameter designation unit 102 designates a virtual viewpoint parameter for the virtual viewpoint image generation unit 104. More specifically, the virtual viewpoint parameter designation unit 102 passes a virtual viewpoint parameter inputted from the virtual viewpoint manipulation unit 110 to the virtual viewpoint image generation unit 104. In S503, the image data obtaining unit 103 obtains, from the multi-viewpoint image data 120, the image data having the image capturing time information indicating the image capturing time designated by the image capturing time designation unit 101. In S504, based on the image data obtained by the image data obtaining unit 103, the virtual viewpoint image generation unit 104 generates virtual viewpoint image data according to the virtual viewpoint parameter designated by the virtual viewpoint parameter designation unit 102. In S505, the virtual viewpoint parameter assignment unit 105 assigns the virtual viewpoint parameter designated by the virtual viewpoint parameter designation unit 102 to the virtual viewpoint image data generated by the virtual viewpoint image generation unit 104 to thereby generate second virtual viewpoint image data. In S506, the virtual viewpoint parameter assignment unit 105 outputs the generated second virtual viewpoint image data.

Note that the above description, a case where a virtual viewpoint parameter is assigned to virtual viewpoint image data in a still image format has been taken as an example. However, virtual viewpoint parameters can be assigned to virtual viewpoint image data in a moving image file format (hereinafter simply referred to as a moving image format) by, for example, repeating the processes of S501 to S506 as many times as the number of frames in the virtual viewpoint image data desired to be generated. Cases of assigning virtual viewpoint parameters to virtual viewpoint image data in a moving image format will be described below.

Figure 6A:
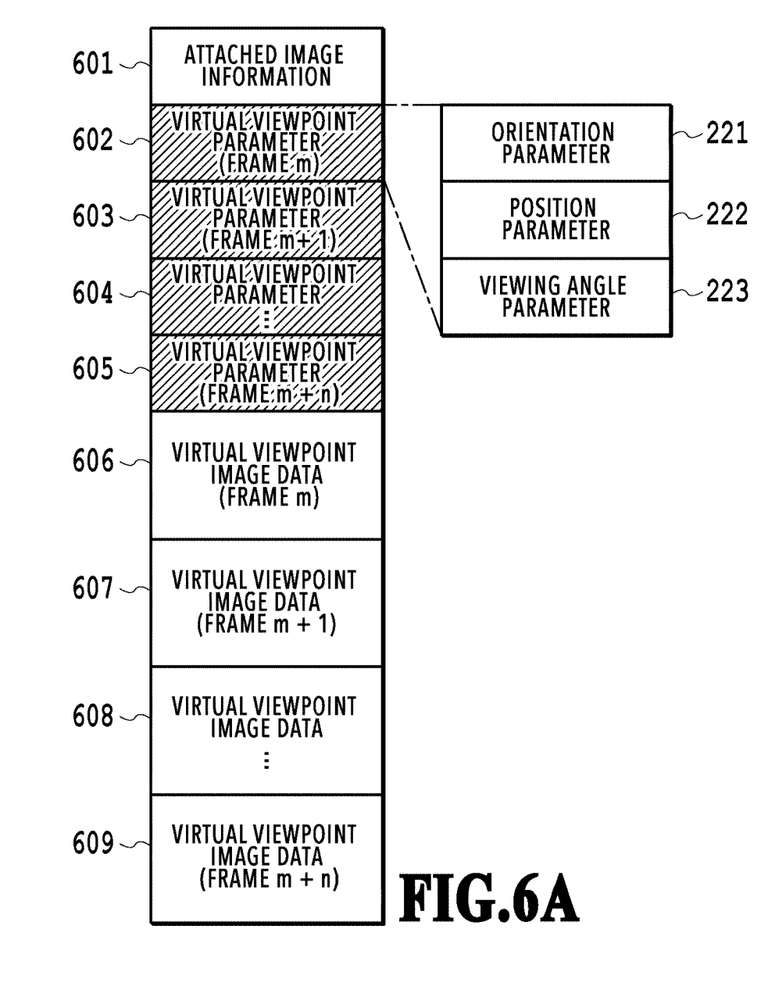
FIGS. 6A and 6B are diagrams for explaining methods of assigning virtual viewpoint parameters to pieces of virtual viewpoint image data in a moving image file format.
Figure 6B:
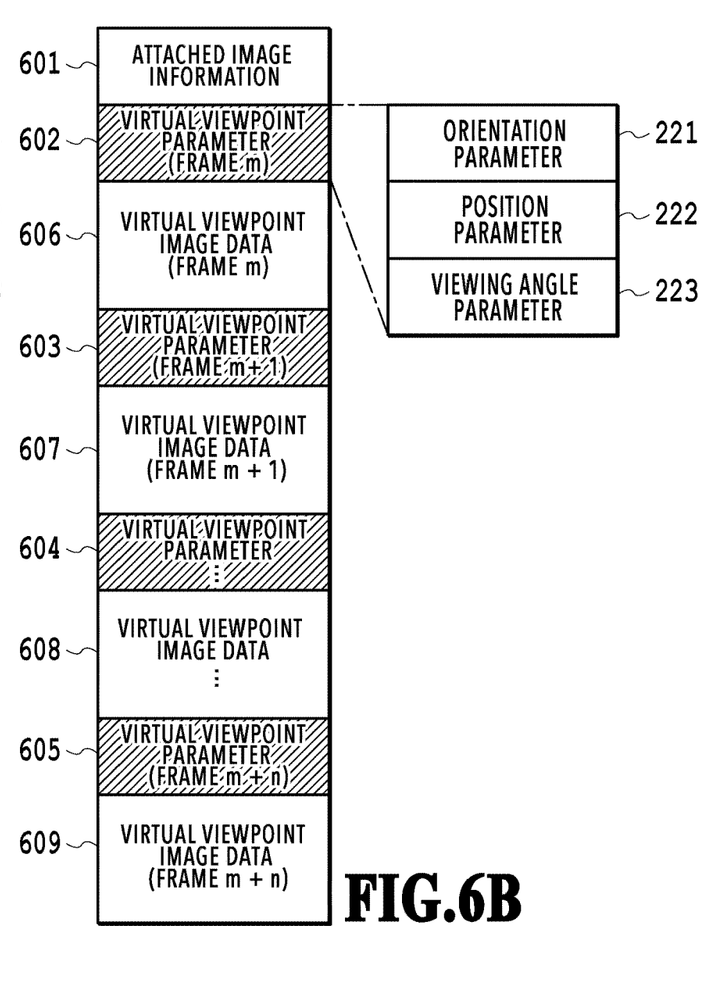

FIGS. 6A and 6B are diagrams showing example moving image formats with virtual viewpoint parameters assigned.

Here, the description will be given by using moving image data including n+1 frames (frame m to frame m+n) as an example.

FIG. 6A shows a format in which virtual viewpoint parameters 602 to 605 for respective pieces of virtual viewpoint image data 606 to 609 of all frames are stored together in a header area in the head of a file. The format shown in FIG. 6A is suitable for, for example, a moving image generated as a file. FIG. 6B shows a format in which the virtual viewpoint parameters 602 to 605 for the pieces of virtual viewpoint image data 606 to 609 are stored immediately before the respective pieces of data. The format shown in FIG. 6B is suitable for, for example, a moving image to be streamed. Note that the example shown in FIG. 6B represents an instance where virtual viewpoint parameters for pieces of virtual viewpoint image data are stored immediately before them, but the storage method is not limited to the one shown in FIG. 6B. For example, the virtual viewpoint parameters for the pieces of virtual viewpoint image data may be stored immediately after them. Also, the example shown in FIG. 6B represents an instance where pieces of virtual viewpoint image data and virtual viewpoint parameters for these pieces of virtual viewpoint image data are stored in a chronological order of frames, but they do not necessarily have to be in a chronological order of frames.

Figure 7:
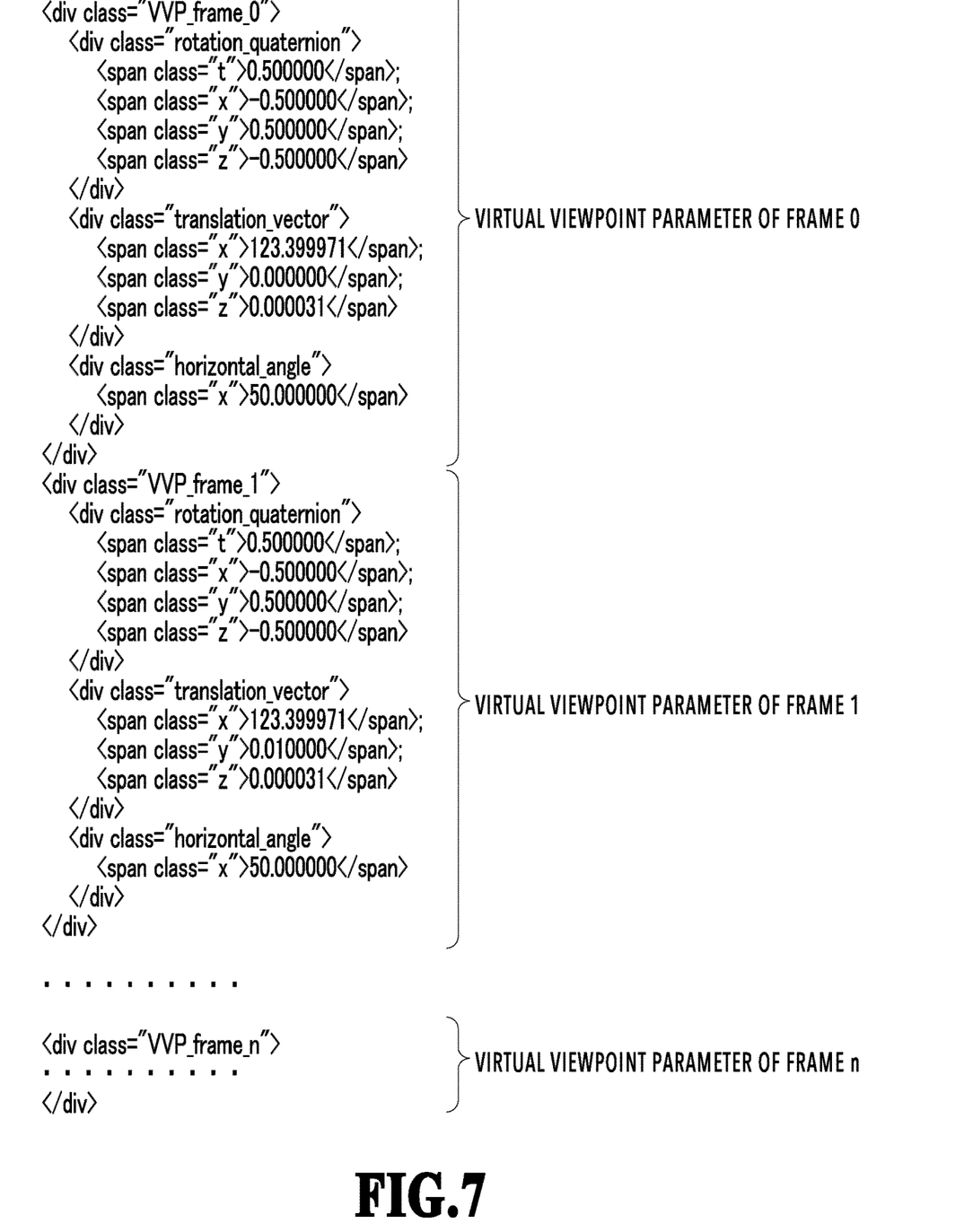
FIG. 7 is a diagram for explaining a method of assigning virtual viewpoint parameters in Vorbis as Ogg Vorbis.

FIG. 7 is a diagram for explaining a method of assigning virtual viewpoint parameters in Vorbis as Ogg Vorbis. Ogg Vorbis (http://www.vorbis.com/) is one of moving image formats. FIG. 7 shows an example case of assigning virtual viewpoint parameters (virtual viewpoint parameters for frame 0 to frame n of virtual viewpoint image data) as Vorbis Comments. In each section <div class="rotation_quaternion"> in FIG. 7, the value t represents the real part of the quaternion, and x, y, and z represents the imaginary part. Also, the values x, y, and z in each section <div class="transiation_vector"> represent the three-dimensional coordinate values, and the value x in each section <div class="horizontal_angle"> represents the horizontal viewing angle. Note that the representation method for the virtual viewpoint parameter in each frame is not limited to the example shown in FIG. 7. In other words, another representation method may be used. Also, in the above example, Vorbis has been described as an example of the moving image format, but the format is not limited to this. The format may be another format or an original format. For example, a moving image format such as ISO/IEC 14496-12 (so-called ISOBMFF (base media file format)), ISO/IEC 14496-14 (so-called MP4 file), or ISO/IEC 14496-15 may be employed. In such a case, each virtual viewpoint parameter may be described in, for example, a free description area (Box) such as a User Data Box (udta) or a Free Space Box (free, skip). Alternatively, each virtual viewpoint parameter may be described in, for example, a movie box (moov). Also, there is a possibility that the parameters in a virtual viewpoint image and an area (Box) to store them may eventually be defined in a file format. In such a case, the virtual viewpoint parameter may be described in an mvhd (movie header box) inside a movie box, a trak (track box) in likewise a movie box, or the like.

Further, the present embodiment is applicable not only to still image formats and moving image formats but also to, for example, formats capable of storing an image sequence such as ISO/IEC 23008-12 (so-called HEIF).

Figure 8:
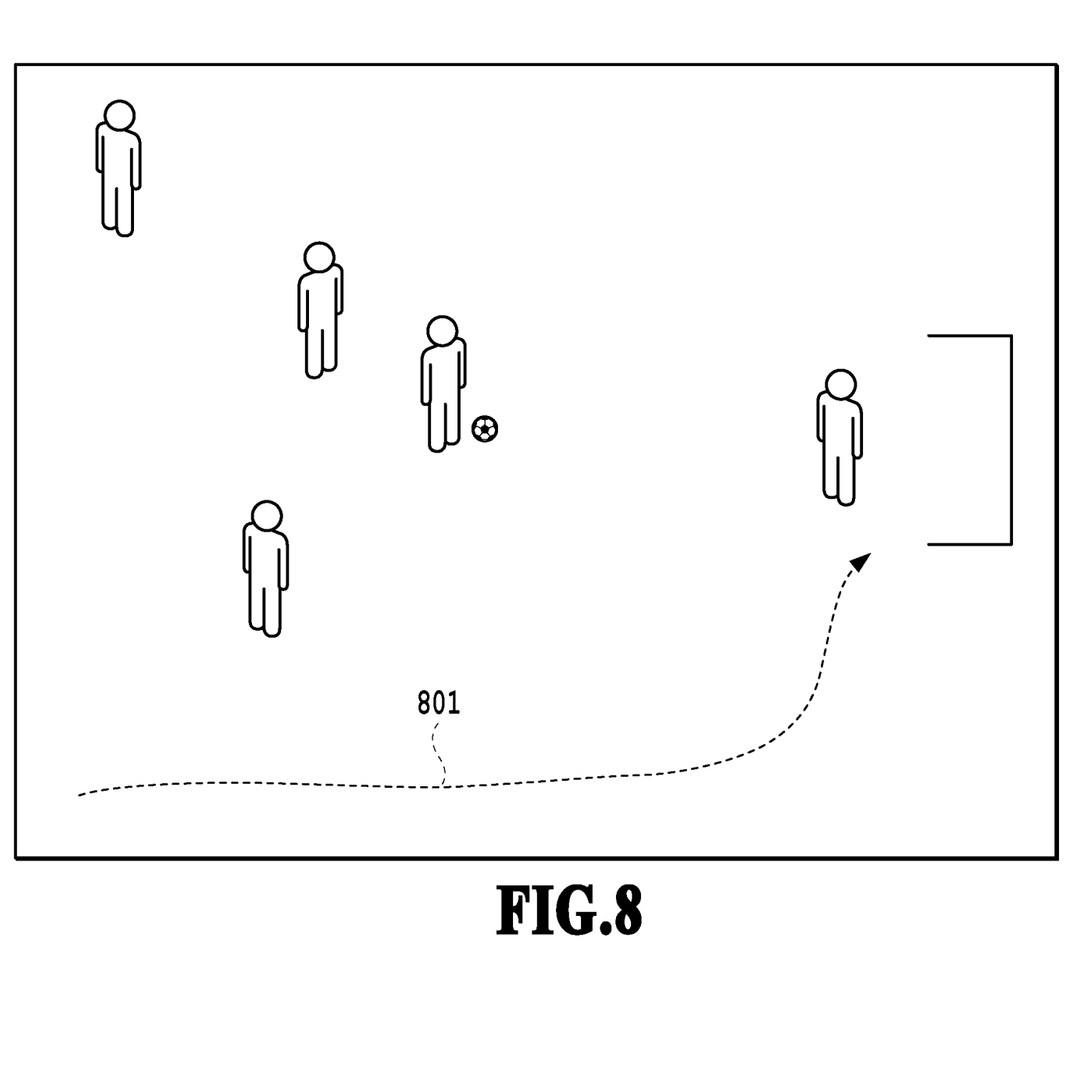
FIG. 8 is a diagram showing a display example of virtual viewpoint image data with virtual viewpoint parameters assigned.

FIG. 8 is a diagram showing a display example of virtual viewpoint image data with virtual viewpoint parameters assigned.

FIG. 8 shows a display example in which a trail of a virtual viewpoint (an arrow 801 with a broken line in the diagram) is displayed over a virtual viewpoint image. For example, the virtual viewpoint parameter assignment unit 105 outputs the second virtual viewpoint image data 130, i.e., virtual viewpoint image data with virtual viewpoint parameters assigned, to a display apparatus not shown. Then, when displaying a virtual viewpoint image represented by the virtual viewpoint image data, the display apparatus not shown displays the trail 801 of the virtual viewpoint over the virtual viewpoint image based on the virtual viewpoint parameters assigned to the virtual viewpoint image data. In this way, it is possible to display a virtual viewpoint image as shown in FIG. 8.

As described above, the image processing apparatus 100 in the present embodiment assigns a virtual viewpoint parameter(s) to generated virtual viewpoint image data to generate second virtual viewpoint image data. This makes it possible to obtain information on the virtual viewpoint from the virtual viewpoint image data in a simple and easy manner. Thus, according to the present embodiment, it is possible to easily identify a desired piece of virtual viewpoint image data from among a plurality of pieces of virtual viewpoint image data. Also, as shown in FIG. 8, it is possible to visualize the virtual viewpoint parameters used to generate virtual viewpoint image data based on the information on the virtual viewpoint obtained from the virtual viewpoint image data. Moreover, it is possible to correct some of the virtual viewpoint parameters assigned to second virtual viewpoint image data to generate new second virtual viewpoint image data. In other words, it is possible to edit the virtual viewpoint in a virtual viewpoint image afterwards. Further, by storing pieces of virtual viewpoint image data with virtual viewpoint parameters assigned thereto in a storage apparatus or the like, it is possible to extract a desired piece of virtual viewpoint image data from among the pieces of virtual viewpoint image data stored in the storage apparatus or the like. For example, it is possible to refer to the virtual viewpoint parameters assigned to pieces of virtual viewpoint image data and search for a piece of virtual viewpoint image data having a desired virtual viewpoint parameter. It is also possible to, for example, refer to the virtual viewpoint parameters assigned to pieces of virtual viewpoint image data and group virtual viewpoint images having the same or similar virtual viewpoints.

Meanwhile, a case where information indicating a virtual viewpoint's position, orientation, and viewing angle is stored as a virtual viewpoint parameter has been taken as an example in the present embodiment. However, in place of the above parameter or in addition to the above parameter, other information may be stored as a virtual viewpoint parameter. For example, identification information (such as a user name) of the user who set the virtual viewpoint, the date and time when the virtual viewpoint was set, the date and time when the virtual viewpoint image data was generated, and/or the like may be stored. Also, for example, information on the codec of the virtual viewpoint image data, information on the distance of movement of the virtual viewpoint, and/or information on the playback time of the virtual viewpoint image data may be stored. Moreover, for example, information on restrictions on playback of the virtual viewpoint image data (such as identification information of users allowed to play back the virtual viewpoint image data, and the number of times the virtual viewpoint image data is allowed to be played back) may be stored.

Also, the usage of virtual viewpoint parameters is not limited to the above methods. Specifically, the usage is not limited to visualization of the virtual viewpoint parameters, search for a piece of virtual viewpoint image data, and grouping of pieces of virtual viewpoint image data. The usage may also include, for example, selection of a recommended content, sorting of a content list, and checking of individual files (e.g., referring with a property in a case where the user wishes to remember when the virtual viewpoint was set).

Also, in the present embodiment, virtual viewpoint parameters are included and described in a single piece of data or a single file, but the present embodiment is not limited to this. For example, the virtual viewpoint parameters of pieces of virtual viewpoint image data may be managed in separate files associated respectively with the pieces of virtual viewpoint image data.

Further, an apparatus that assigns a virtual viewpoint parameter to a piece of virtual viewpoint image data at the time of generating it has been taken as an example in the present embodiment. However, a piece of virtual viewpoint image data may be generated and a virtual viewpoint parameter may separately be assigned to it thereafter. For example, it is possible to perform control so as to generate a virtual viewpoint parameter using a record of the position and orientation of the virtual camera manipulated by the user at the time of generating a piece of virtual viewpoint image data, and assign the virtual viewpoint parameter to the piece of virtual viewpoint image data.

According to the present invention, it is possible to improve usability related to virtual viewpoint images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A generation apparatus comprising:
one or more memories; and
one or more processors functioning by executing instructions stored in the one or more memories as the following units:
an obtaining unit configured to obtain a plurality of sets of virtual viewpoint parameters, the virtual viewpoint parameters indicating a position of a virtual viewpoint and a direction from a virtual viewpoint, and being used to for generating virtual viewpoint image data generated based on image data obtained based on image capturing by a plurality of imaging devices; and
a generation unit configured to generate a media file storing the plurality of sets of virtual viewpoint parameters obtained by the obtaining unit and virtual viewpoint image data generated based on the plurality of sets of virtual viewpoint parameters obtained by the obtaining unit, (i) the plurality of sets of virtual viewpoint parameters being stored in a header area in a head of the media file, (ii) each of sets of virtual viewpoint parameters corresponding to one of frames included in the virtual viewpoint image data, and (iii) a set of virtual viewpoint parameters including a parameter for specifying one of the frames included in the virtual viewpoint image data, a parameter indicating a position of the virtual viewpoint corresponding to the one of the frames included in the virtual viewpoint image data, and a parameter indicating a direction from the virtual viewpoint corresponding to the one of the frames included in the virtual viewpoint image data.

2. The generation apparatus according to claim 1, wherein the media file is a file in a still image format, and the generation unit stores the plurality of sets of virtual viewpoint parameters obtained by the obtaining unit in a metadata area in the media file.

3. The generation apparatus according to claim 2, wherein the still image format is Exif, and the plurality of sets of virtual viewpoint parameters obtained by the obtaining unit is stored in an IFD area defined in an Exif standard inside the metadata area in the media file.

4. The generation apparatus according to claim 2, wherein the still image format is Exif, and the plurality of sets of virtual viewpoint parameters obtained by the obtaining unit is stored in an APPn marker segment not defined in an Exif standard inside the metadata area in the media file.

5. The generation apparatus according to claim 1, wherein the media file is a file in a moving image format, and the generation unit stores the virtual viewpoint image data and the plurality of sets of virtual viewpoint parameters in the media file in a chronological order of the frames.

6. The generation apparatus according to claim 5, wherein the moving image format is Ogg Vorbis.

7. The generation apparatus according to claim 1, wherein the media file is a file in a moving image format, and the moving image format is Ogg Vorbis.

8. The generation apparatus according to claim 1, wherein the set of virtual viewpoint parameters further includes a parameter indicating a viewing angle of the virtual viewpoint.

9. The generation apparatus according to claim 1, wherein a virtual viewpoint image displayed on a display screen based on the media file includes a figure representing a trajectory of the virtual viewpoint corresponding to the virtual viewpoint parameter in the media file.

10. The generation apparatus according to claim 1, wherein the parameter for specifying the one of the frames included in the virtual viewpoint image data is a flame number of the one of the frames included in the virtual viewpoint image data.

11. The generation apparatus according to claim 1, wherein the parameter for specifying the one of the frames included in the virtual viewpoint image data is a time code of the one of the frames included in the virtual viewpoint image data.

12. A generation method comprising:
  obtaining a plurality of sets of virtual viewpoint parameters, the virtual viewpoint parameters indicating a virtual viewpoint and a direction from a virtual viewpoint, and being used for generating virtual viewpoint image data generated based on image data obtained based on image capturing by a plurality of imaging devices; and
  generating a media file storing the plurality of sets of virtual viewpoint parameters and virtual viewpoint image data generated based on the obtained plurality of sets of virtual viewpoint parameters, (i) the plurality of sets of virtual viewpoint parameters being stored in a header area in a head of the media file, (ii) each of sets of virtual viewpoint parameters corresponding to one of frames included in the virtual viewpoint image data, and (iii) a set of virtual viewpoint parameters including a parameter for specifying one of the frames included in the virtual viewpoint image data, a parameter indicating a position of the virtual viewpoint corresponding to the one of the frames included in the virtual viewpoint image data, and a parameter indicating a direction from the virtual viewpoint corresponding to the one of the frames included in the virtual viewpoint image data.

13. A non-transitory computer readable storage medium storing a program which causes a computer to perform a generation method, the generation method comprising:
  obtaining a plurality of sets of virtual viewpoint parameters, the virtual viewpoint parameters indicating a virtual viewpoint and a direction from a virtual viewpoint, and being used for generating virtual viewpoint image data generated based on image data obtained based on image capturing by a plurality of imaging devices; and
  generating a media file storing the plurality of sets of virtual viewpoint parameters and virtual viewpoint image data generated based on the obtained plurality of sets of virtual viewpoint parameters, (i) the plurality of sets of virtual viewpoint parameters being stored in a header area in a head of the media file, (ii) each of sets of virtual viewpoint parameters corresponding to one of frames included in the virtual viewpoint image data, and (iii) a set of virtual viewpoint parameters including a parameter for specifying one of the frames included in the virtual viewpoint image data, a parameter indicating a position of the virtual viewpoint corresponding to the one of the frames included in the virtual viewpoint image data, and a parameter indicating a direction from the virtual viewpoint corresponding to the one of the frames included in the virtual viewpoint image data.

* * * * *